US006346286B1

(12) United States Patent
Council et al.

(10) Patent No.: US 6,346,286 B1
(45) Date of Patent: Feb. 12, 2002

(54) SORPTIVE PURIFICATION FOR EDIBLE OILS

(75) Inventors: Steven T. Council, Elgin; G. Robert Goss, Quincy; Dov Shaked, Buffalo Grove, all of IL (US)

(73) Assignee: Oil-Dri Corporation of America, Chicago, IL (US)

(*) Notice: Subject to any disclaimer, the term of this patent is extended or adjusted under 35 U.S.C. 154(b) by 0 days.

(21) Appl. No.: 08/429,326

(22) Filed: Apr. 26, 1995

(51) Int. Cl.[7] .................................................. A23D 9/06

(52) U.S. Cl. .................... 426/330.6; 426/442; 426/488; 426/601

(58) Field of Search .............................. 426/330.6, 442, 426/488, 601; 208/305

(56) References Cited

U.S. PATENT DOCUMENTS

| | | | | |
|---|---|---|---|---|
| 4,120,782 A | * 10/1978 | Audeh et al. | ............... | 208/305 |
| 4,629,588 A | 12/1986 | Welsh et al. | ................ | 260/428 |
| 4,734,226 A | 3/1988 | Parker et al. | ............... | 260/420 |
| 4,764,384 A | 8/1988 | Gyann | ........................ | 426/417 |
| 4,781,864 A | 11/1988 | Pryor et al. | ................. | 260/420 |
| 5,004,570 A | 4/1991 | Brooks et al. | .............. | 260/427 |
| 5,151,211 A | 9/1992 | Brooks et al. | ........... | 252/186.1 |

OTHER PUBLICATIONS

Atkins, P.W., *Physical Chemistry*, 2nd Edition, Oxford, New York (1982), pp. 367–374.

March, J., *Advanced Organic Chemistry*, 4th Edition, Wiley, New York (1992), pp. 248–272.

Goebel, E.H., Bleaching Practices in the U.S., *J. Am. Oil Chemists' Soc.* 53: 342–343 (1976).

Gutfinger, T. et al., Pretreatment of osybean oil for physical refining: evaluation of efficiency of various adsorbents in removing phospholipids and pigments, *J. Am. Oil Chemists' Soc.* 55: 856–859 (1978).

Hvolby, A., Removal of nonhydratable phospholipids from soybean oil, *J. Am. Oil Chemists' Soc.* 48: 503–509 (1971).

Jamieson, G.S., *Vegetable Fats and Oils*, Reinhold Publishing Corp., New York (1943), pp. 300–311.

Levadoux, W.L., et al., Pigment removal from canola oil using chlorophyllase, *J. Am. Oil Chemists' Soc.* 63: 470 354P (1986).

Morgan, D.A., et al., The function of bleaching earths in the processing of palm, palm kernel and coconut oils, *J. Am. Oil Chemists' Soc.* 62: 292–299 (1985).

Patterson, H.B.W., Bleaching practices in Europe, *J. Am. Oil Chemists' Soc.* 53: 339–341 (1976).

Shaw, D.B., et al., The role of water addition in the bleaching of fats and oils, *J. Am. Oil Chemists' Soc.* 63: 470–471 356P (1986).

Swoboda, P.A.T., Chemistry of refining, *J. Am. Oil Chemists' Soc.* 62: 287–292 (1985).

* cited by examiner

*Primary Examiner*—Helen Pratt
(74) *Attorney, Agent, or Firm*—Olson & Hierl, Ltd.

(57) ABSTRACT

Pre-treatment sorbents suitable for sorptive pre-treatment of edible oils prior to bleaching are produced by mixing a clay mineral composition with a dry granular organic acid.

20 Claims, 2 Drawing Sheets

SORPTIVE PURIFICATION FOR EDIBLE OILS

TECHNICAL FIELD

This invention relates to clay-based compositions suitable for the purification of edible oils. In particular, the present invention is directed to clay and organic acid compositions useful in the pretreatment of edible oils prior to bleaching.

BACKGROUND OF THE INVENTION

Fats and fatty oils, commonly called triglycerides, are triesters of glycerol, and include minor amounts of fatty acids. At ambient temperatures of about 20 to about 25 degrees C fats are solids, whereas fatty oils are liquids.

Triglycerides are widely distributed in nature. Some triglycerides are edible while others are not. Many are derived directly from vegetable, animal, and marine sources. Others are obtained, as by-products, in the production of fiber from vegetable matter, and in the production of protein from vegetable, animal or marine matter.

Edible vegetable oils include canola, coconut, corn germ, cottonseed, olive, palm, peanut, rapeseed, safflower, sesame seed, soybean, and sunflower oils. Examples of nonedible vegetable oils are jojoba oil, linseed oil and castor oil.

Illustrative sources of edible animal-derived oil include lard and tallow. Examples of nonedible animal-derived oil are low grade tallow and neat's-foot oils.

Crude edible oils contain a number of impurities, both naturally occurring and introduced in storage and processing, that must be removed. Such impurities include phospholipids, soaps, phosphorus, and trace metals, including calcium, magnesium, iron and copper. See generally, Jamieson, G. S. *Vegetable Fats and Oils*, Reinhold Publishing Corp., New York (1943).

Phospholipids, which occur in most natural fats and oils include lecithin, cephalin (phosphatidylethanolamine) and phosphatidylinositol. Phospholipids can cause objectionable colors, odors and flavors in a finished oil product.

Phosphorus and metal ions such as calcium, magnesium, iron, and copper are believed to be chemically associated with phospholipids, including phosphatides, have deleterious effects on refined oil products. Moreover, calcium and copper can form precipitates, while iron and copper promote oxidative instability. Each metal ion is associated with catalyst poisoning where refined oil is catalytically hydrogenated at a later step.

Free fatty acids (FFA) result from hydrolysis of the triglycerides of the edible oils. Color impurities typically present in oils include, for example, carotenoids, xanthophylls, xanthophyll esters, chlorophyll, tocopherols, as well as oxidized fatty acids and fatty acid polymers. Peroxides (reported as peroxide value, PV) are products of oxidation of the oil.

Edible oils are generally subjected to a number of processing steps. The usual treatment steps are shown in FIG. 1 which is provided as a general summary. Some processing methods may omit some of these steps, while other steps may be required in some applications. See generally Swoboda, P. A. T., *J. Amer. Oil Chem. Soc.* 62: 287–292 (1985). The present invention relates especially to the steps up to and including clay bleaching.

Crude edible oil from storage is subjected to degumming, which comprises treatment with an acid such as phosphoric or citric acid. Degumming prepares the phosphatides for removal. Following degumming the oil may be physically refined, chemically refined or both. Refining removes the bulk of the phosphatides, primarily as calcium and magnesium salts. Physical refining comprises exposing the oil to steam so as to remove undesirable constituents. Chemical refining involves neutralization of the acid-degummed oil with alkali followed by water washing and centrifugation. Neutralization of the oil with alkali can produce soaps that must be removed at later steps.

A sorptive purification step prior to bleaching further removes impurities from the oil before it contacts the bleaching clays. This pretreatment of the oil before the bleaching step removes substantial amounts of impurities remaining from the previous steps, thereby improving the efficiency and useful life of the bleaching clays.

Clay bleaching also removes colors that might be objectionable to a consumer. Bleaching clays generally improve oil color quality by adsorbing color impurities that are present.

The use of a clay pre-treatment sorbent for sorptive purification provides several benefits to the refiner. By removing most of the contaminants upstream, the efficacy of the bleaching clay is improved significantly. The absence of contaminants prevents "poisoning" of the bleaching clay and leaves more active sites exposed on the clay surface to adsorb chlorophyll and color bodies. Improved efficiency of the bleaching clay also means that the refiner can reduce the total amount of clay while achieving a better final product. Reduced clay dosages, in turn, reduce spent filter cake disposal.

What is needed as such a pre-treatment product is a filtering sorbent medium which has a high affinity for polar contaminants such as phospholipids, soaps, and trace metals from glyceride oils prior to bleaching. By removing most of such contaminants upstream, the efficacy of the bleaching clay is improved significantly. The clays used in the present invention have more than twice the porosity of other commercially available clays.

We have found that the addition of certain dry granular organic acids to high porosity clay greatly enhances its adsorption capabilities for these polar contaminants which capabilities meet or exceed the performance of commercially available silica gels.

Such a pre-treatment sorbent clay product provides several economical and environmental benefits. Improved efficiency of the bleaching clay would permit a reduction in the total amount of clay (pre-treatment sorbent plus bleaching clay) while achieving a better final oil product. Effective removal of soaps allows the elimination of the water wash processing step, which is costly and currently has a number of environmental implications due to the need for proper disposal of the waste water.

SUMMARY OF THE INVENTION

Highly active clay-derived pre-treatment sorbents are obtained by the co-grinding of clays with dry, granular organic acids having a $pK_a$ value in the range of about 1 to about 7 and being substantially free from organic acid salts. The pre-treatment clay adsorbents of the present invention improve the efficiency and useful life of bleaching clays. The pre-treatment clay sorbents also are environmentally responsible alternatives to silica gels, thereby reducing the total clay used in the process and eliminating a wash step that produces waste water.

Clay combined with anhydrous malic acid or the like organic acid produces a highly active pre-treat sorbent capable of removing polar contaminants from refined glyceride oils such as soybean and canola when used in a sorptive purification step that precedes bleaching. Such contaminants include soaps, phospholipids and associated trace metal ions (magnesium, calcium, iron, and copper) which, when present at certain levels in oil, have a deleterious effect on taste, odor, color, and stability. The pre-treatment sorbent of the present invention provides performance comparable to that of silica gel adsorbents in the removal of phospholipids and trace metals, as well as in soap removal. The present pre-treatment sorbent composition also provides a number of additional advantages over silica gels such as improved bleaching of red colors, effective chlorophyll removal, and reduction of peroxide values. The stability of the pre-treatment sorbent composition is excellent at moisture levels below about 5 weight percent.

DETAILED DESCRIPTION OF THE PREFERRED EMBODIMENTS

Figure 1:
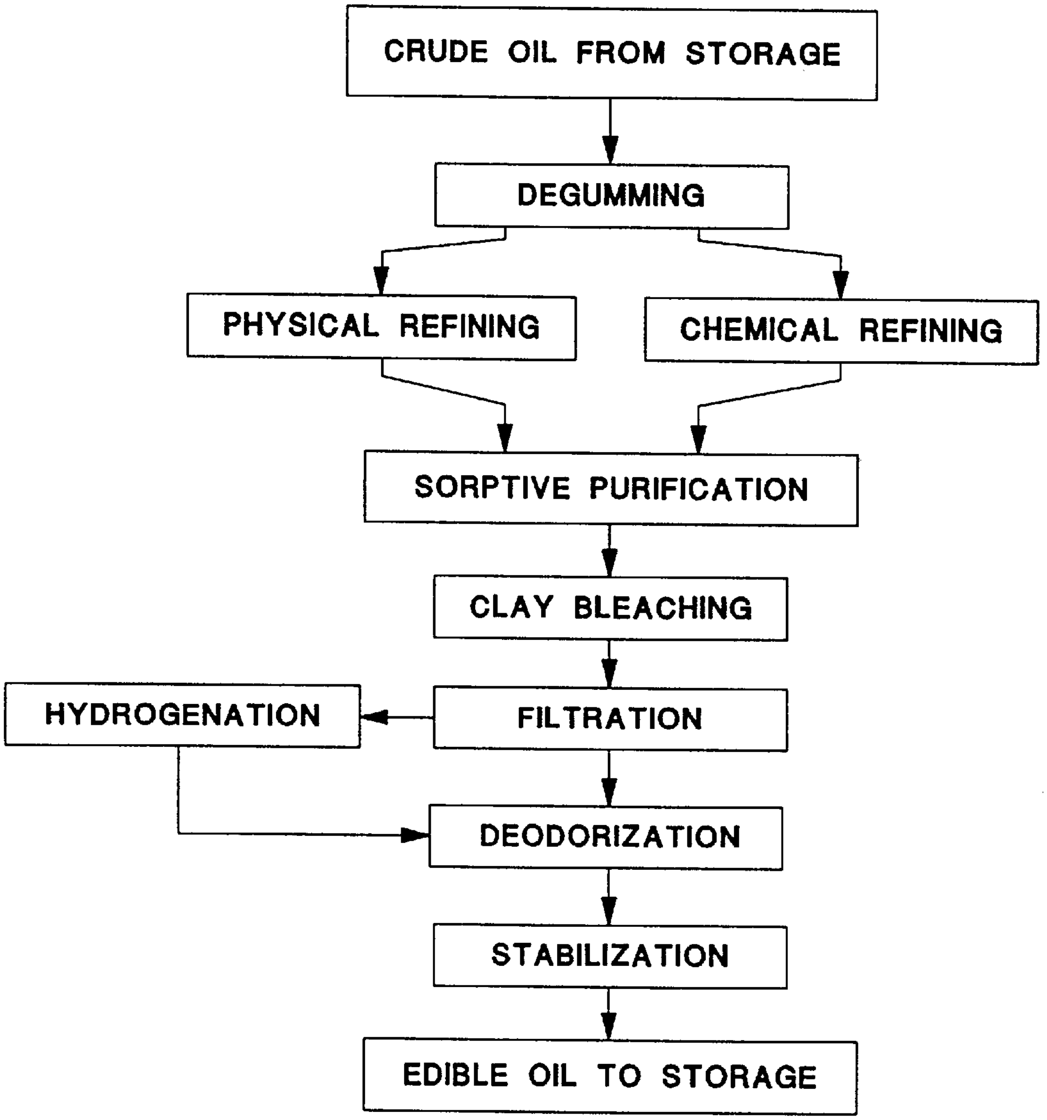
FIG. 1 shows a general summary of the usual treatment steps in the processing of edible oils. Some processing methods may omit some of these steps, while other steps may be required in some applications.

While this invention is susceptible to embodiments in many different forms, preferred embodiments of the invention are described below. The present disclosure is to be considered as an exemplification of the principles of the invention and is not intended to limit the invention to the specific embodiments illustrated.

Throughout this application, the term "oil," and the grammatical variations thereof, includes vegetable-derived, animal-derived as well as marine source-derived fats and fatty oils that are liquids at the particular temperature that is necessary for desired processing of a particular type of oil.

In use, the oil and the present oil pre-treatment composition are combined in a suitable vessel to produce a slurry. The resulting slurry is maintained at an elevated temperature and at a pressure no greater than about atmospheric pressure for a time period sufficient to reduce the amount of impurities of the oil without causing degradation of the oil, i.e., the oil is pre-treated without thermal decomposition of the oil. In as much as the pre-treatment is usually followed by bleaching, the pre-treatment sorbent may be left in the slurry during the bleaching step and removed together with the bleaching clay.

The pre-treatment is performed at a temperature elevated above room temperature, i.e., at about 50 degrees C and higher, but below the temperature that induces thermal decomposition of the acid and/or of the oil. A preferred pre-treatment temperature is in a range of about 50 to about 130 degrees C, more preferably about 60 to about 125 degrees C.

The pre-treatment conditions are varied appropriately depending on the edible oil. Soybean oil and canola oil are typically pre-treated for about 20 minutes at temperatures from about 80 degrees C to about 100 degrees C. Palm oil is typically pre-treated for about 20 minutes at temperatures from about 110 degrees C to about 120 degrees C.

The pressure at which the pretreatment is performed can be atmospheric or less than atmospheric (subatmospheric), as desired.

The time period sufficient to reduce the amount of impurities in the oil utilizing the present pre-treatment adsorbents compositions usually is in a range of about 5 to about 90 minutes.

Oils that can be pre-treated using the composition of the present invention include edible as well as inedible oils. Illustrative oils are those previously mentioned hereinabove.

Clays suitable for use in the present invention are sorbent clays, i.e., those clays characterized by a mineral structure formed by the arrangement of the clay mineral crystallites that give an open texture containing micropores (below 2 nm in width), mesopores (2 to 50 nm in width) and macropores (above 50 nm in width). The clay mineral crystallites can be palygorskites (attapulgites), sepiolites, or smectites or mixtures of the foregoing.

Palygorskite (attapulgite), a mineral found in some clays, is a hydrous silicate material represented by the approximate formula:

$$(OH_2)_4(OH)_2Mg_5Si_8O_{20}\cdot 4H_2O.$$

See, e.g., Grim, R. E., *Clay Mineralogy*, 2nd ed., McGraw-Hill, Inc., New York, N.Y. (1968), p. 115.

Smectite is a generic term that refers to a variety of related minerals also found in some clays. The smectite minerals typically occur only as extremely small particles. Generally, smectite is believed to be composed of units made of two silica tetrahedral sheets with a central alumina octahedral sheet. Each of the tetrahedra has a tip that points to the center of the smectite unit. The tetrahedral and octahedral sheets are combined so that the tips of the tetrahedra of each silica sheet and one of the hydroxyl layers of the octahedral sheet form a common layer. See *Id*., pp. 77–78.

In particular, the smectite family of clays includes the various mineral species montmorillonite, nontronite, hectorite and saponite, all of which can be present in clay in varying amounts.

Other minerals, neither of the smectite genus nor of the palygorskite variety, that can be present in clay include apatite, calcite, the feldspars, kaolinite, mica, quartz and sepiolite.

For pre-treatment prior to bleaching an oil, the amount of the present pre-treatment sorbent that is combined with the oil usually is in the range of about 0.04 to about 0.6 weight percent, based on the weight of the oil. Lesser or larger amounts can be used, depending upon the oil to be treated and the level and type of contaminants to be removed.

The process of producing the pre-treatment sorbent embodying the present invention can be carried out batchwise, or as a continuous process, as convenient. The mixing of the clay and granular organic acid can be readily achieved by the use of a static mixer, a commercially available blender, or the like expedient.

Suitable clays have a bulk density from about 320 to about 560 grams per liter. Preferably the bulk density is from about 320 to about 430 grams per liter. Most preferably the bulk density is about 340 grams per liter.

The starting clay material has a free moisture level of no more than about 8 weight percent, and preferably less than about 5 weight percent, based on the weight of the clay. The clay is mixed and/or co-ground with a dry granular organic acid to a particle size of approximately 65% through 325 mesh sieve, U.S. Sieve Series. Preferably the clay is co-ground with the organic acid. The size of the clay particles is comparable to the size of the organic acid particles. A preferred size distribution is obtained when the ratio of the mean clay particle size to the mean acid particle size is in the range of about 0.8 to about 1.2.

The organic acid is a particulate, polycarboxylic organic acid having a $pK_a$ value in the range of about 1 to about 7 and substantially free from organic acid salts. Suitable organic acids are citric, malic, maleic, ascorbic, tartaric, oxalic and fumaric acids and blends thereof. A preferred organic acid is anhydrous malic acid. The pre-treatment sorbent of the present invention preferably is maintained at less than about 5 weight percent free moisture until use to preserve optimum effectiveness and shelf life.

The present invention is illustrated by the following examples.

EXAMPLE 1

Enhancement of Bleaching by Pre-Treatment with Clay-Organic Acid Sorbent Composition The properties of several concentrations of organic acid mixed with clay were studied. Each composition was evaluated for its ability to remove phospholipids, magnesium, calcium, iron, chlorophyll, and red color from canola oil. Each composition was used as a pre-treat composition at about 0.6 weight percent, based on weight of oil, prior to the use of a bleaching clay at about 1 weight percent, based on the weight of oil.

Phosphorus and metals contents were determined spectrophotometrically using a Beckman Spectra Span IV Direct Coupled Plasma (DCP) spectrophotometer or an Indirect Coupled Plasma (ICP) spectrophotometer. The detection wavelengths and detection limits were: phos-phorus 213.618 nm, 0.09 mg/l; calcium 315.887 nm, 0.03 mg/l; magnesium 279.553 nm, 0.0002 mg/l; iron 259.940 nm, 0.007 mg/l. Soap concentrations were determined according to A.O.C.S. Recommended Practice Cc 17–79.

Red color bodies were determined with the Beckman Spectrophotometer using the absorbance at 450 nm or by Lovibond Tintometer PFX990 (HF Scientific, Inc.) using A.O.C.S. color scales. Absorption of chlorophyll pigments were determined with a Beckman Spectrophotometer. Oxidative Stability was determined with an Omnion ADM Oxidative Stability Instrument. Peroxide values (PV) were determined by A.O.C.S. Recommended Practice Cd 8b-90. Free fatty acids (FFA) determined by A.O.C.S. Official Method Ca 5a-40.

Pre-treatments

The starting clay material was ground to approximately ⅛ inch in size in a hammer mill and dried to a free moisture level of less than about 5 weight percent, based on the weight of the clay. The clay was allowed to cool and malic acid was mixed and co-ground with the clay in a laboratory Mikro-Pulverizer in amounts up to about 8 weight percent based on the weight of the clay.

The size of the clay particles was comparable to the size of the organic acid particles, i.e., about 650 weight percent of the co-ground particles passed through a 325 mesh sieve, U.S. Sieve Series. The preferred size distribution is when the ratio of the mean clay particle size to the mean acid particle size is in the range of about 0.8 to about 1.2.

Unless specified otherwise, all pre-treatments were conducted using 0.6 weight percent (based on the weight of oil) pre-treat adsorbent. The pre-treatment adsorbent was added to moderately agitated refined canola oil at about 60 degrees C. Oil temperature was raised to about 82 to about 88 degrees C, and was maintained at that temperature for a time period of 20 minutes. If the pre-treatment was followed by bleaching, the adsorbent used in the pre-treatment remained in the oil during the bleaching step. If the pre-treatment was the final processing step (such is the case for all soap data presented herein below), the pre-treated oil was filtered using nitrogen pressure on a Baroid filter cell press (Series 300) lined with 90 mm Whatman 541 hardened ashless filter paper.

For canola oil, bleaching clay was added to moderately agitated refined or pre-treated oil at about 82 to about 88 degrees C. A reduced pressure was applied to the bleaching vessel at a pressure of 26 inches of mercury. The oil temperature was raised to 110 degrees C and maintained at that temperature for a period of 30 minutes. Oil was filtered using nitrogen pressure on a Baroid filter cell press (Series 300) lined with 90 mm Whatman 541 hardened ashless filter paper.

For soybean oil, bleaching clay was added to moderately agitated refined or pre-treated oil at about 82 to about 88 degrees C. The temperature was raised to 120 degrees C and maintained at that temperature for 30 minutes. A vacuum was applied to the bleaching vessel at 26 inches of mercury, and oil was filtered using nitrogen pressure on a Baroid filter cell press (Series 300) lined with 90 mm Whatman 541 hardened ashless filter paper.

Figure 2:
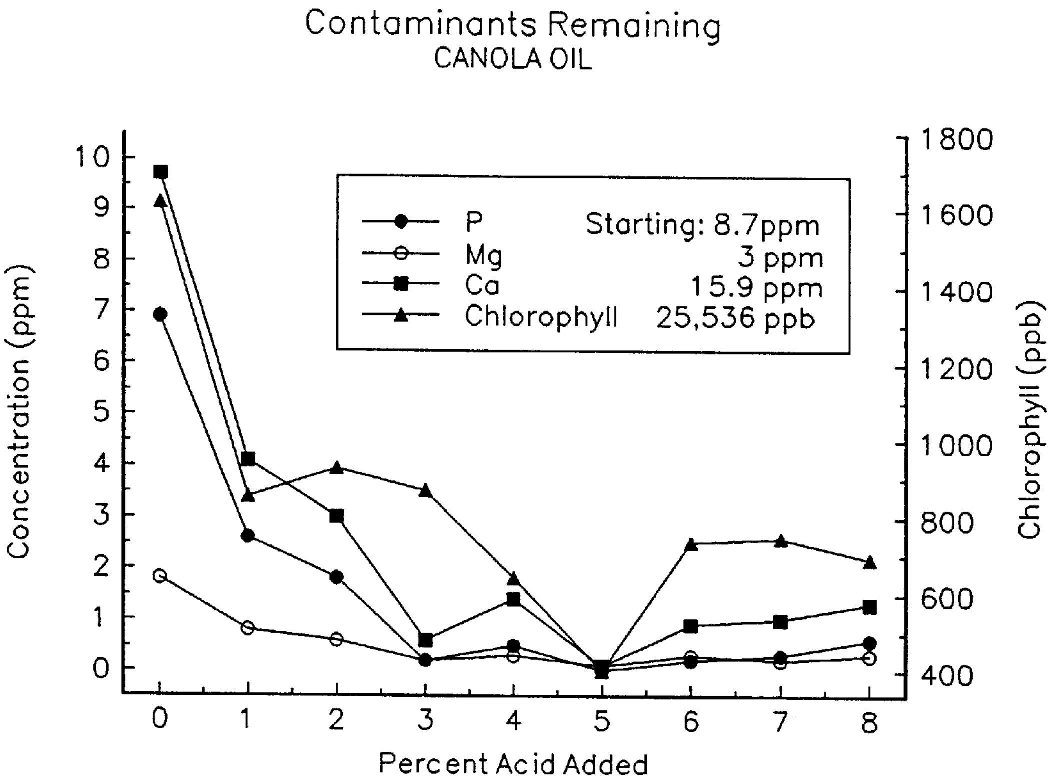
FIG. 2 shows the results obtained using pre-treatment sorbent compositions comprising different concentrations of organic acid. Each composition was evaluated for its ability to remove phospholipids, magnesium, calcium, iron, (left ordinate) and chlorophyll (right ordinate) from canola oil. Each composition was used as a pre-treat composition at a level of about 0.6 weight percent, based on weight of oil, prior to the use of a bleaching clay at about 1 weight percent, based on weight of oil.

The results presented in Table 1 and Table 2, below, and in FIG. 2, show that the use of a pre-treat sorbent composition substantially assists in removal of impurities. These results further show that the amount of anhydrous malic acid added is preferably from about 4 to about 6 weight percent, based on the weight of the clay. More preferably 5 weight percent anhydrous malic acid, based on the weight of the clay, is added.

TABLE 1

EFFECT OF MALIC ACID ADDITION TO PRE-TREAT CANOLA OIL (PRE-TREATMENT WITH 0.6 WEIGHT PERCENT SORBENT COMPOSITION FOLLOWED BY BLEACHING WITH 1 WEIGHT PERCENT CLAY)

| Weight Percent Acid in Composition | | Chlorophyll (ppb) | P (ppm) | Mg (ppm) | Ca (ppm) | Fe (ppm) | Red Color (Absorbance at 450 nm) |
|---|---|---|---|---|---|---|---|
| | Start | 25,536 | 8.7 | 3 | 15.9 | 0 | 4.1 |
| 0 | | 1,620 | 6.9 | 1.8 | 9.7 | 0 | 1.1 |
| 1 | | 856 | 2.6 | 0.8 | 4.1 | 0 | 0.8 |
| 2 | | 930 | 1.8 | 0.6 | 3.0 | 0 | 0.8 |

TABLE 1-continued

EFFECT OF MALIC ACID ADDITION TO PRE-TREAT CANOLA OIL (PRE-TREATMENT WITH 0.6 WEIGHT PERCENT SORBENT COMPOSITION FOLLOWED BY BLEACHING WITH 1 WEIGHT PERCENT CLAY)

| Weight Percent Acid in Composition | Chlorophyll (ppb) | P (ppm) | Mg (ppm) | Ca (ppm) | Fe (ppm) | Red Color (Absorbance at 450 nm) |
|---|---|---|---|---|---|---|
| 3 | 871 | 0.2 | 0.2 | 0.6 | 0 | 0.7 |
| 4 | 645 | 0.5 | 0.3 | 1.4 | 0 | 0.7 |
| 5 | 404 | 0 | 0.1 | 0.1 | 0 | 0.6 |
| 6 | 738 | 0.2 | 0.3 | 0.9 | 0 | 0.7 |
| 7 | 748 | 0.3 | 0.2 | 1.0 | 0 | 0.7 |
| 8 | 694 | 0.6 | 0.3 | 1.3 | 0 | 0.6 |

TABLE 2

Oxidative Stability at 110 degrees C. of Pre-treated, Bleached and Deodorized Canola Oil

| Pre-treat Adsorbent | Bleaching Clay | Red Color[3] | FFA (% oleic acid) | PV (meq/kg) | OSI[2] (hours) |
|---|---|---|---|---|---|
| Tonsil ® EX 459[4] | 2.5% PURE-FLO PRO-ACTIVE[1] | 1.0 R | 0.030 | 0.60 | 7.4 |
| TRISYL ® 300[5] | 2.5% PURE-FLO PRO-ACTIVE[1] | 1.2 R | 0.025 | 0.55 | 7.2 |
| Present Invention[6] Lot I | 2.5% PURE-FLO PRO-ACTIVE[1] | 1.1 R | 0.035 | 0.60 | 6.9 |
| Present Invention[6] Lot II | 2.5% PURE-FLO PRO-ACTIVE[1] | 1.4 R | 0.040 | 0.45 | 7.3 |

[1]$H_2SO_4$ - enhanced bleaching clay
[2]Oxidative Stability Index
[3]By Lovibond Tintometer
[4]Süd-Chemie AG, Germany
[5]W. R. Grace Co., NY
[6]Malic acid (5 weight percent) co-ground with clay having less than 5 weight percent free moisture.

EXAMPLE 2

Phosphorus and Metals Removal Compared to Silica Gels

The pre-treat sorbent composition was produced and impurities were measured as described in Example 1. Results for phosphorus and trace metal adsorption are presented in Table 3, below. The protocol used canola oil subjected to the indicated weight percent pre-treat followed by 1 weight percent bleach. The sorbent of the present invention showed a significant reduction of phospholipids (measured as phosphorus), magnesium and calcium. The sorbent of the present invention performed significantly better than Trisyl® Silica gel product and equal to or slightly better than Trisyl® 300 Silica gel product without having to increase dosage or change refining conditions.

TABLE 3

Phosphorus and Metals Adsorption

| Pre-Treat Adsorbents | Dosage (% w/w oil) | P (ppm) |
|---|---|---|
| None (bleach only) | 0 | 7.1 |
| Trisyl ® Silica | 0.04 | 6.4 |
| Trisyl ® 300 Silica | 0.04 | 6.2 |
| Present Invention | 0.04 | 6.6 |
| Trisyl ® Silica | 0.08 | 6.5 |

TABLE 3-continued

Phosphorus and Metals Adsorption

| Pre-Treat Adsorbents | Dosage (% w/w oil) | P (ppm) |
|---|---|---|
| Trisyl ® 300 Silica | 0.08 | 5.3 |
| Present Invention | 0.08 | 4.7 |
| Trisyl ® Silica | 0.12 | 7.0 |
| Trisyl ® 300 Silica | 0.12 | 5.3 |
| Present Invention | 0.12 | 5.1 |
| Trisyl ® Silica | 0.16 | 6.8 |
| Trisyl ® 300 Silica | 0.16 | 3.4 |
| Present Invention | 0.16 | 3.6 |

EXAMPLE 3

Soap Removal

The pre-treat sorbent composition was produced as described in Example 1. Table 4, below, shows results of soap removal as compared to a commercial silica product (Trisyl® Silica). Soap results were generated from a primary soybean oil containing high soaps and a blended refined soybean oil containing a 5:1 blend of refined and primary soybean oil. The oil was subjected to the indicated weight percent pre-treat followed by 1 weight percent bleach.

TABLE 4

| Soap Removal From Soybean Oil | | | |
|---|---|---|---|
| | Pre-Treat Adsorbents | Dosage (% w/w oil) | Soaps (ppm) |
| Comparisons in Primary Soybean Oil | Trisyl ® Silica | 0 | 243.5 |
| | | 0.075 | 184.2 |
| | | 0.3 | 28.9 |
| | Trisyl ® 300 Silica | 0 | 243.5 |
| | | 0.075 | 230.1 |
| | | 0.3 | 11.3 |
| | Present Invention | 0 | 243.5 |
| | | 0.075 | 158.3 |
| | | 0.3 | 2.4 |
| Comparisons in Blended Soybean Oil | Trisyl ® Silica | 0 | 47.6 |
| | | 0.05 | 21.9 |
| | | 0.1 | 16.9 |
| | | 0.15 | 9 |
| | Trisyl ® 300 Silica | 0 | 47.6 |
| | | 0.05 | 21.9 |
| | | 0.1 | 17.1 |
| | | 0.15 | 0 |
| | Present Invention | 0 | 47.6 |
| | | 0.05 | 11.6 |
| | | 0.1 | 5.8 |
| | | 0.15 | 0 |

EXAMPLE 4

Chlorophyll and Red Color Removal

The pre-treat sorbent composition was produced as described in Example 1. The chlorophyll removal protocol used canola oil subjected to a 0.6 weight percent pre-treat followed by 1 weight percent bleach. The red color comparisons were produced from a protocol using canola oil subjected to the indicated weight percent pre-treat followed by 1 weight percent bleach. Chlorophyll and red color removal were evaluated and compared to commercially available products.

TABLE 5

| Chlorophyll Comparisons | |
|---|---|
| Pre-Treat Adsorbents | Chlorophyll (ppb) |
| None (original oil) | 25,536 |
| Trisyl ® Silica | 1,403 |
| Trisyl ® 300 Silica | 1,348 |
| PURE-FLO PRO-ACTIVE[1] | 1,398 |
| Present Invention | 733 |

[1]$H_2SO_4$-enhanced bleaching clay

Percent compositions were also compared to silica at relatively low pre-treat dosages (0.04–0.16 weight percent based on the weight of the oil). At these low dosages the compositions of the present invention were comparable to Trisyl® 300 Silica in the adsorption of phospholipids, and better in removal of chlorophyll and red color.

TABLE 6

| Red Color Comparisons | | |
|---|---|---|
| Pre-Treat Adsorbents | Dosage | A.O.C.S. Red Color |
| None (bleach only) | 0 | 11.5 |
| Trisyl ® Silica | 0.04 | 11.5 |
| Trisyl ® 300 Silica | 0.04 | 11.7 |
| Present Invention | 0.04 | 11.1 |
| Trisyl ® Silica | 0.08 | 12.1 |
| Trisyl ® 300 Silica | 0.08 | 11.6 |
| Present Invention | 0.08 | 10.8 |
| Trisyl ® Silica | 0.12 | 10.9 |
| Trisyl ® 300 Silica | 0.12 | 10.2 |
| Present Invention | 0.12 | 9.7 |
| Trisyl ® Silica | 0.16 | 10.2 |
| Trisyl ® 300 Silica | 0.16 | 9.7 |
| Present Invention | 0.16 | 8.8 |

The pre-treat sorbent composition of the present invention was equal or superior to the commercially available alternatives at all dosage levels.

EXAMPLE 5

Field Data

Each pre-treatment was added at the weight percent (based on the weight of oil) indicated in Table 7. The pre-treatment adsorbent was added to stirred refined soybean oil at about 60 degrees C. Oil temperature was raised to about 77 to about 88 degrees C, and was maintained at that temperature for a time period of 20 minutes. The pre-treatment was followed by bleaching; the adsorbent used in the pre-treatment remained in the oil during the bleaching step. PURE-FLO PRO-ACTIVE bleaching clay was added at about 0.5 weight percent (based on the weight of oil) to the stirred pre-treated oil and a reduced pressure was applied to the bleaching vessel at a pressure of 26 inches of mercury. The oil temperature was raised to about 110 to about 127 degrees C and maintained at that temperature for a period of 30 minutes. Oil was filtered using nitrogen pressure on a Baroid filter cell press (Series 300) lined with 90 mm Whatman 541 hardened ashless filter paper. Samples were taken for analysis before and after pre-treatment and after bleaching. The results are presented in Table 7.

TABLE 7

| Product Analytical Field Data | | | | | | | | |
|---|---|---|---|---|---|---|---|---|
| | Chlorophyll (ppm) | FFA's | Soap (ppm) | PV | P | Red Color | Yellow Color | A450 |
| 0.03% Trisyl ® | | | | | | | | |
| REFINED | * | * | * | * | * | * | * | * |
| PRETREAT | 672 | 0.056 | 8.9 | 2.45 | 2.1 | 9.7 | 70 | 3.9 |
| BLEACHED | 0 | 0.071 | 0 | 0.57 | 0.1 | 3.5 | 70 | 0.5 |

TABLE 7-continued

| Product Analytical Field Data | Chlorophyll (ppm) | FFA's | Soap (ppm) | PV | P | Red Color | Yellow Color | A450 |
|---|---|---|---|---|---|---|---|---|
| 0.06% Trisyl ® | | | | | | | | |
| REFINED | 664 | 0.082 | 3.8 | 0.86 | 0.9 | 8.3 | 70 | 3.5 |
| PRETREAT | 651 | 0.08 | 0.4 | 2.91 | 0.6 | 9.4 | 70 | 3.4 |
| BLEACHED | 9.8 | 0.12 | 0 | 0.40 | 0.2 | 3 | 63 | 0.4 |
| 0.03% Sorbent Composition | | | | | | | | |
| REFINED | 697 | 0.05 | 8.2 | 0.59 | 1.9 | 8.8 | 70 | 3.5 |
| PRETREAT | 677 | 0.055 | 2.7 | 2.00 | 0.8 | 8.9 | 70 | 3.6 |
| BLEACHED | 3.9 | 0.072 | 0 | 0.20 | 0.3 | 2.6 | 67 | 0.3 |
| 0.06% Sorbent Composition | | | | | | | | |
| REFINED | 739 | 0.177 | 3.8 | 0.68 | 2 | 9 | 70 | 3.5 |
| PRETREAT | 722 | 0.143 | 0.5 | 1.43 | 1.2 | 9.1 | 70 | 3.4 |
| BLEACHED | 0 | 0.13 | 0 | 0.33 | 0.3 | 3 | 57 | 0.4 |

* NOT AVAILABLE

EXAMPLE 6

Product Stability and Moisture Content

Anhydrous malic acid is deliquescent and readily dissolves in water. For this reason it is desirable to dry the clay to as little free moisture as practicable. Furthermore, the mixture of clay and acid preferably is kept in a dry environment in order to maintain stability over an extended time period. Experiments have shown that if the acid is blended with clay which has less than 5% free water, the acid and product will remain stable over time. Table 8, below, shows the performance of high and low moisture samples of the present invention over time. The pre-treatment sorbent was added to stirred refined canola oil at about 60 degrees C. Oil temperature was raised to about 82 to about 88 degrees C, and was maintained at that temperature for a time period of 20 minutes. The pre-treatment was followed by bleaching with about 1 weight percent (based on the weight of oil) PURE-FLO PRO-ACTIVE bleaching clay. The bleaching clay was added to the stirred pre-treated oil and a reduced pressure was applied to the bleaching vessel at a pressure of 26 inches of mercury. The oil temperature was raised to about 110 to about 127 degrees C and maintained at that temperature for a period of 30 minutes.

It is clear from the results presented in Table 8 that the higher moisture content product loses much of its ability to adsorb phospholipids from the edible oil after a relatively short period of time.

TABLE 8

Product Stability: Phosphorus Removal

| DAYS AGED | LOW MOISTURE CONTENT: 3.6% P (ppm) | HIGH MOISTURE CONTENT: 16.6% P (ppm) |
|---|---|---|
| Original | 8.7 | 8.7 |
| 1 | 0.3 | 1.0 |
| 7 | 0.4 | 2.0 |
| 11 | 0.5 | 3.0 |
| 17 | 1.0 | 3.5 |
| 31 | 1.2 | 3.2 |
| 47 | 1.2 | 4.6 |
| 59 | 1.9 | 5.3 |
| 66 | 1.9 | 5.8 |

TABLE 8-continued

Product Stability: Phosphorus Removal

| DAYS AGED | LOW MOISTURE CONTENT: 3.6% P (ppm) | HIGH MOISTURE CONTENT: 16.6% P (ppm) |
|---|---|---|
| 75 | 2.1 | 5.2 |
| 103 | 1.2 | 5.4 |

In contrast, the low-moisture pre-treatment sorbent in Table 8 shows excellent performance for more than 100 days from date of manufacture when the free moisture is less than about 5 percent by weight, and preferably about 3 percent by weight.

Stability of the present composition can be further enhanced by product packaging. Malic acid is deliquescent, i.e., it will absorb atmospheric moisture if left exposed to a humid environment. Clay, especially when dried to such low free moisture, will also absorb atmospheric moisture under humid conditions. Paper packaging will absorb atmospheric moisture under humid conditions as well. A package that reduces exposure of the product to humidity will ensure relatively longer shelf life.

Three controlled environments were produced in glass desiccators containing 98, 70 and 47% humidity. These environments were created by placing various concentrations of sulfuric acid in the bottom of each desiccator. The higher the acid concentration, the less humidity was created. The pre-treat sorbent was placed in a 2-ply paper bag and sealed. Plain paper packaging with no clay was also added to each unit to determine how much moisture adsorbed was from the bag. Table 9, below, shows the amount of moisture the present product and paper packaging absorbed under these conditions.

In an environment at 97% humidity, the tested composition adsorbed 1.6% moisture after 24 hours and 10.5% moisture after 500 hours. In an environment at 70% humidity, moisture adsorption was much reduced but still significant: 24 hours, 0.22%; 500 hours, 1.1%. In an environment at 47% humidity, the tested composition released water into the atmosphere.

TABLE 9

| Atmospheric Moisture Adsorption | | | | |
|---|---|---|---|---|
| Conditions | Time (hours) | Bag mass (g) | Clay mass (g) | Percent water gain |
| 22 degrees C, 97% Humidity | 0 | 11.81 | 461.99 | 0 |
| | 6 | 12.29 | 464.03 | 0.3 |
| | 24 | 12.49 | 470.06 | 1.6 |
| | 168 | 12.77 | 492.69 | 6.4 |
| | 504 | 13.13 | 511.8 | 10.5 |
| 22 degrees C, 70% Humidity | 0 | 11.81 | 463.3 | 0 |
| | 6 | 12.07 | 463.53 | 0.006 |
| | 24 | 12.11 | 464.16 | 0.22 |
| | 168 | 12.12 | 467.36 | 0.81 |
| | 504 | 12.09 | 468.64 | 1.1 |
| 22 degrees C, 47% Humidity | 0 | 11.42 | 455.44 | 0 |
| | 6 | 11.42 | 454.42 | −0.22 |
| | 24 | 11.43 | 454.4 | −0.23 |
| | 168 | 11.43 | 454.15 | −0.28 |
| | 504 | 11.42 | 453.48 | −0.43 |

Example 7

Comparison of Organic Acids as Additives

The starting clay material was ground to approximately ⅛ inch in size in a hammer mill and dried to a free moisture level of less than about 5 weight percent based on the weight of the clay. The clay was allowed to cool, and 5 weight percent of an additive (see Table 10, below) based on the weight of the clay was mixed and co-ground with the clay in a laboratory Mikro-Pulverizer.

Pre-Treat Conditions:

An aliquot (200 g) of refined canola oil was heated to 60 degrees C. The pretreat sorbent was added to the heated oil with moderate agitation to a final concentration of 0.6 weight percent based on the weight of the oil. The temperature was raised to about 82 to about 88 degrees C for 20 minutes at atmospheric pressure.

Bleaching Conditions:

Bleaching clay was added to stirred refined or pre-treated canola oil at a temperature of about 82 to about 88 degrees C. The clay used was PURE-FLO PRO-ACTIVE, a $H_2SO_4$—enhanced bleaching clay. The clay was added to a final concentration of 1 weight percent based on the weight of the oil. A reduced pressure was applied to the bleaching vessel at a pressure of 26 inches of mercury. The oil temperature was raised to about 110 degrees C and maintained at that temperature for a period of 30 minutes. Oil was filtered using nitrogen pressure on a Baroid filter cell press (Series 300) lined with 90 mm Whatman 541 hardened ashless filter paper. Chlorophyll content, phosphorus content, red color and yellow color were determined as described in Example 1.

TABLE 10

| Results of Pre-Treatment Followed by Bleaching | | | | | |
|---|---|---|---|---|---|
| | | P | Chloro-phyll | A.O.C.S. Color | |
| SAMPLE | $pK_a$ | (ppm) | (ppb) | Red | Yellow |
| UNTREATED CANOLA OIL | — | 7.0 | 25,536 | >20 | >70 |
| 5% MALIC ACID | 3.40; 5.2 | 0.6 | 940 | 4.8 | 70 |
| 5% MALEIC ACID | 1.93; 6.58 | 0.7 | 655 | 5.1 | 70 |
| 5% ASCORBIC ACID | 4.17; 11.57 | 2.2 | 679 | 5.9 | 70 |

TABLE 10-continued

| Results of Pre-Treatment Followed by Bleaching | | | | | |
|---|---|---|---|---|---|
| | | P | Chloro-phyll | A.O.C.S. Color | |
| SAMPLE | $pK_a$ | (ppm) | (ppb) | Red | Yellow |
| 5% TARTARIC ACID | 2.89; 4.16 | 0.8 | 615 | 5.6 | 70 |
| 5% GLUTARIC ACID | 4.34; 5.42 | 0.4 | 1014 | 4.8 | 70 |
| 5% MALONIC ACID | 2.83; 5.69 | 0.7 | 438 | 5.0 | 70 |
| 2.5% CITRIC ACID + 2.5% MALIC ACID | — | 0.1 | 871 | 4.9 | 70 |
| 5% OXALIC ACID | 1.25; 4.14 | 0.5 | 502 | 5.4 | 70 |
| 5% FUMARIC ACID | 3.03; 4.54 | 1.4 | 965 | 6.0 | 70 |
| 5% CITRIC ACID | 3.09; 4.75; 5.41 | 0.3 | 744 | 5.1 | 70 |
| BLEACHING CLAY[1] ONLY | — | 2.6 | 723 | 5.8 | 70 |

[1] $H_2SO_4$-enhanced bleaching clay.

All of the additives tested except ascorbic acid were effective in substantially reducing phospholipids measured as P. The removal of chlorophyll, red color and yellow color varied over a relatively broad range.

We claim:

1. A composition suitable for purification of an edible oil and comprising a mixture of particulate clay and a particulate, polycarboxylic organic acid having a $pK_a$ value in the range of about 1 to about 7 and being substantially free from organic acid salts; said clay having a free moisture content of no more than about 8 percent by weight, based on the weight of the clay, and said polycarboxylic organic acid being present in an amount in the range of about 1 to about 8 percent by weight, based on the weight of the composition.

2. The composition in accordance with claim 1 wherein the free moisture content is less than about 5 percent.

3. The composition in accordance with claim 1 wherein the clay is an palygorskite-smectite mixture.

4. The composition in accordance with claim 1 wherein the clay is a hormite-smectite mixture.

5. The composition in accordance with claim 1 wherein the clay is a smectite-opal mixture.

6. The composition in accordance with claim 1 wherein the organic acid is anhydrous malic acid.

7. The composition in accordance with claim 1 wherein the organic acid is maleic acid.

8. The composition in accordance with claim 1 wherein the organic acid is ascorbic acid.

9. The composition in accordance with claim 1 wherein the organic acid is tartaric acid.

10. The composition in accordance with claim 1 wherein the organic acid is glutaric acid.

11. The composition in accordance with claim 1 wherein the organic acid is malonic acid.

12. The composition in accordance with claim 1 wherein the organic acid is oxalic acid.

13. The composition in accordance with claim 1 wherein the organic acid is fumaric acid.

14. The composition in accordance with claim 1 wherein the organic acid is citric acid.

15. The composition in accordance with claim 1 wherein the organic acid is a mixture of citric acid and malic acid.

16. An article of manufacture comprising: a composition comprising a clay mineral and at least one organic acid substantially free from organic acid salts and selected from the group consisting of malic acid, citric acid, maleic acid, tartaric acid, glutaric acid, malonic acid, oxalic acid, fumaric acid and mixtures thereof in a package provided with a vapor barrier.

17. A method of sorptive purification of edible oils prior to bleaching which comprises contacting the edible oil with a particulate composition comprising clay mineral particles and particles of at least one organic acid substantially free from organic acid salts, said organic acid being selected from the group consisting of malic acid, citric acid, maleic acid, tartaric acid, oxalic acid, fumaric acid and mixtures thereof, and said contacting being carried out at a temperature greater than about 50 degrees C but below the thermal decomposition temperature of the acid for a period of about 5 to about 90 minutes.

18. The method in accordance with claim 17 wherein the acid is citric acid.

19. The method in accordance with claim 17 wherein the acid is a mixture of citric acid and malic acid in equal parts by weight.

20. The method in accordance with claim 17 wherein the acid is anhydrous malic acid.

* * * * *